(12) United States Patent
Huge et al.

(10) Patent No.: US 12,252,108 B2
(45) Date of Patent: Mar. 18, 2025

(54) BRAKING SYSTEM AND VEHICLE HAVING THE BRAKING SYSTEM

(71) Applicant: HELLA GmbH & Co. KGaA, Lippstadt (DE)

(72) Inventors: Kerim Florian Huge, Lippstadt (DE); Andreas Mueller, Lippstadt (DE); Fabian Utermoehlen, Lippstadt (DE); Claus Viethen, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 247 days.

(21) Appl. No.: 17/948,801

(22) Filed: Sep. 20, 2022

(65) Prior Publication Data
US 2023/0018082 A1    Jan. 19, 2023

Related U.S. Application Data

(63) Continuation of application No. PCT/EP2021/055741, filed on Mar. 8, 2021.

(30) Foreign Application Priority Data
Mar. 20, 2020  (DE) ............... 10 2020 107 706.8

(51) Int. Cl.
*B60T 7/04*  (2006.01)
*B60T 8/32*  (2006.01)
*B60T 8/92*  (2006.01)

(52) U.S. Cl.
CPC ........... *B60T 8/3255* (2013.01); *B60T 7/042* (2013.01); *B60T 8/92* (2013.01); *B60T 2220/04* (2013.01);

(Continued)

(58) Field of Classification Search
CPC ..................................................... B60T 7/042
See application file for complete search history.

(56) References Cited

U.S. PATENT DOCUMENTS

| 5,954,407 A | 9/1999 | Schramm et al. |
| 5,961,190 A | 10/1999 | Brandmeier et al. |

(Continued)

FOREIGN PATENT DOCUMENTS

| CN | 106458192 A | 2/2017 |
| DE | 19510525 A1 | 9/1996 |

(Continued)

OTHER PUBLICATIONS

International Search Report dated Jun. 16, 2021 in corresponding application PCT/EP2021/055741.

*Primary Examiner* — Long T Tran
(74) *Attorney, Agent, or Firm* — Muncy, Geissler, Olds & Lowe, P.C.

(57) ABSTRACT

A braking system for a vehicle, having a brake pedal, a position sensor unit for determining position data regarding an actuation distance and/or a pivot angle of the brake pedal of the vehicle, a force sensor unit for determining force data regarding an operating force with which the brake pedal is operated, a control unit, and an additional control unit. The position sensor unit has a signal connection to the control unit and to the additional control unit for transmitting the position data to the control unit as well as to the additional control unit. The force sensor unit has a signal connection to the control unit and to the additional control unit for transmitting the force data to the control unit as well as to the additional control unit.

13 Claims, 4 Drawing Sheets

(52) U.S. Cl.
CPC ... *B60T 2270/402* (2013.01); *B60T 2270/404* (2013.01); *B60T 2270/413* (2013.01); *B60T 2270/82* (2013.01)

(56) References Cited

U.S. PATENT DOCUMENTS

| | | |
|---|---|---|
| 7,837,278 B2 | 11/2010 | Nilsson |
| 8,177,308 B2 | 5/2012 | Ralea |
| 10,351,110 B2 | 7/2019 | Besier et al. |
| 11,292,446 B2 | 4/2022 | Grieser-Schmitz et al. |
| 2015/0253152 A1 | 9/2015 | Grossmann et al. |
| 2017/0008400 A1* | 1/2017 | Katsuta ................ B60L 3/0015 |
| 2017/0076514 A1* | 3/2017 | Valeri .................... G05B 23/00 |
| 2017/0341631 A1 | 11/2017 | Strehle et al. |
| 2018/0120841 A1* | 5/2018 | Endo ................... B60W 50/082 |
| 2018/0334148 A1* | 11/2018 | Feigel .................. B60T 13/662 |
| 2020/0307538 A1* | 10/2020 | Ganzel ................. B60T 8/4081 |

FOREIGN PATENT DOCUMENTS

| | | |
|---|---|---|
| DE | 19841335 A1 | 8/1999 |
| DE | 102014226211 A1 | 6/2016 |
| EP | 1997703 A2 | 12/2008 |
| EP | 1954538 B1 | 5/2014 |
| ES | 2201148 T3 | 3/2004 |
| WO | WO2012136293 A1 | 10/2012 |

\* cited by examiner

BRAKING SYSTEM AND VEHICLE HAVING THE BRAKING SYSTEM

This nonprovisional application is a continuation of International Application No. PCT/EP2021/055741, which was filed on Mar. 8, 2021, and which claims priority to German Patent Application No. 10 2020 107 706.8, which was filed in Germany on Mar. 20, 2020, and which are both herein incorporated by reference.

BACKGROUND OF THE INVENTION

Field of the Invention

The present invention relates to a braking system for a vehicle, having a brake pedal, a position sensor unit for determining position data regarding an actuation distance and/or a pivot angle of the brake pedal of the vehicle, and a force sensor unit for determining force data regarding an operating force with which the brake pedal is operated. The invention also relates to a vehicle having such a braking system.

Description of the Background Art

Owing to the increasing electrification of the drive train of motor vehicles, and also as a result of heightened emissions requirements, it is necessary to develop new possibilities for creating braking action. Current braking systems are already designed such that the braking action is no longer boosted based on vacuum, but instead by a servoelectric. There is still a mechanical influence on the braking action here, however. This means that a braking action can be achieved by pressing the brake pedal even if there is a failure of the brake booster.

Next generation systems should now be developed further to the effect that the braking command from the driver and the braking action are completely decoupled, as is already the case with today's gas pedals. Since the requirements in terms of safety are significantly higher for a brake pedal as compared to the gas pedal, a higher degree of dissimilar redundancy is necessary in order to detect faults. Consequently, a high number of channels with a correspondingly high signal processing effort in the control device at the vehicle level is necessary.

It is known that both a force sensor and a position or displacement sensor are integrated in the brake pedal, wherein the force sensor is designed as a differential distance measurement sensor with an elastic unit and shares a common printed circuit board with the position sensor. In such a system, all data can be transmitted to higher-level control devices and processed there through both comparison of the sensor channels and signal processing. The driver's braking request can be determined subsequently on the basis of the processed data. One disadvantage of this concept is that many redundant items of sensor information are generally sent to the control devices. It is customary in so-called fail-operational systems for two brake control devices that are separate from one another to be used. The basic idea here is that the two brake control devices share one channel of the brake pedal position measuring arrangement. However, position sensors with established protocols such as "SENT" or "PSI5" cannot send to two receivers in parallel. Furthermore, communication between the two brake control devices in order to exchange information about the brake pedal position either is too slow or is not implemented at all in order to ensure complete independence. Moreover, an availability and security problem can arise owing to the integration of system components on one printed circuit board, since independence with respect to faults cannot be adequately ensured.

A generic braking system corresponding to the above description can be found in the international patent application WO 2012/136293 A1, which corresponds to US2014129108. In that system, the signals of a force sensor and of a position sensor are supplied to a central analysis unit.

SUMMARY OF THE INVENTION

It is therefore an object of the present invention to at least partially make allowances for the problems described above. In particular, it is an object of the present invention to create a simply constructed and reliably functioning electric braking system as well as a vehicle having such a braking system.

At the outset, it is noted that features and details that are described in connection with the braking system also apply in connection with the vehicle according to the invention and vice versa, so mutual reference is and/or can always be made with regard to the disclosure of the individual aspects of the invention.

According to a first aspect of the present invention, a braking system for a vehicle is provided. The braking system has a brake pedal, a position sensor unit for determining position data regarding an actuation distance and/or a pivot angle of the brake pedal of the vehicle, and a force sensor unit for determining force data regarding an operating force with which the brake pedal is operated. The braking system further has a control unit and an additional control unit, wherein the position sensor unit has a signal connection to the control unit and to the additional control unit for transmitting the position data to the control unit as well as to the additional control unit, and wherein the force sensor unit has a signal connection to the control unit and to the additional control unit for transmitting the force data to the control unit as well as to the additional control unit.

As a result, the known prior art is improved to the effect that two control units, in particular two control units arranged separately from one another, are made available in a braking system. In other words, the redundancy is increased by the sensor systems on the control units or corresponding ECUs. The control unit and the additional control unit can each be understood to be a generic or essentially generic control device or a corresponding ECU. The control unit and the additional control unit can be independent of one another and designed differently. In the proposed braking system, the position sensor unit and the force sensor unit can each send in parallel to the two control units, which is to say the control unit and the additional control unit, which is to say transmit the position data or the force data. Increased fault tolerance of the braking system can be achieved in a simple way through the arrangement according to the invention of the control unit and the additional control unit for the respective signal processing of the force data and the position data. Until now, a mechanical and/or hydraulic emergency system for operating the brake pedal was always required in conventional braking systems. This can be dispensed with in principle when the braking system according to the invention is used. The control unit and the additional control unit can themselves each be designed to have multichannel redundancy. In this case, each sensor channel can be connected in parallel to the control unit and the additional control unit.

The phrase 'the position sensor unit is configured for determining the position data' can be understood to mean that the position data can be determined by means of the position sensor unit, and/or corresponding position values, in particular values regarding the pivot angle and/or the actuation distance, can be measured by it. The phrase 'the force sensor unit is configured for determining the force data' can be understood to mean that the force data can be determined by means of the force sensor unit, and/or corresponding force values, in particular values regarding the operating force, can be measured by it.

The signal connection can be, or can be made to be, wired or wireless. In particular, the braking system can have a first signal line for transmitting the position data from the position sensor unit to the control unit and a second signal line, running at least partially in parallel to the first signal line in signaling terms, for transmitting the position data from the position sensor unit to the additional control unit. Accordingly, the braking system can have a third signal line for transmitting the force data from the position sensor unit to the control unit and a fourth signal line, running at least partially in parallel to the third signal line in signaling terms, for transmitting the force data from the position sensor unit to the additional control unit.

The phrase 'the position sensor unit has a signal connection to the control unit and to the additional control unit for transmitting the position data to the control unit as well as to the additional control unit' can be understood to mean that the position sensor unit has a signal connection to the control unit for transmitting the position data to the control unit, and has a signal connection to the additional control unit for transmitting the position data to the additional control unit. The phrase 'the force sensor unit has a signal connection to the control unit and to the additional control unit for transmitting the force data to the control unit as well as to the additional control unit' can be understood to mean that the force sensor unit has a signal connection to the control unit for transmitting the force data to the control unit, and has a signal connection to the additional control unit for transmitting the force data to the additional control unit.

The force sensor can be understood as a pedal force sensor. A position of a force simulator unit of the braking system can be measured by means of the force sensor unit. Displacement measurements can therefore also be performed by means of the force sensor unit. The position sensor can be understood as a pedal travel sensor. The braking system is preferably configured in the form of a brake-by-wire system and/or in the form of an electric braking system, in particular in the form of an exclusively electric braking system with regard to the possible creation of the braking force by the driver that dispenses with purely mechanical and/or purely hydraulic emergency systems for the driver to operate the brake pedal.

According to another embodiment of the present invention, it is possible that the control unit and the additional control unit in a braking system are arranged spaced apart from one another. Furthermore, it is possible that the control unit and the additional control unit are designed to be dissimilar from one another. Moreover, it is possible in a braking system according to the present invention that the sensor channel pairs of the position sensor unit and/or of the force sensor unit are each designed to be at least partially galvanically isolated from one another. As a result, the operational safety of the braking system can be further improved or the fault tolerance can be increased in each case. The phrase 'the control unit and the additional control unit are designed to be dissimilar from one another' can be understood to mean that the two control units are not only redundant, but are also intentionally configured and/or equipped with different functional components.

In a braking system according to the present invention, it is furthermore possible that the position sensor unit and/or the force sensor unit each have at least two sensor channel pairs that are arranged separately from one another, wherein one sensor channel pair in each case has a signal connection to the control unit for transmitting the position data or the force data to the control unit, and a different sensor channel pair has a signal connection to the additional control unit for transmitting the position data or the force data to the additional control unit. As a result, the fault tolerance can be increased still further. The phrase 'the position sensor unit and/or the force sensor unit each have at least two sensor channel pairs that are arranged separately from one another' should be understood to mean that the position sensor unit can have at least two sensor channel pairs that are arranged separately from one another and the force sensor unit can likewise have at least two sensor channel pairs that are arranged separately from one another. The phrase 'one sensor channel pair in each case has a signal connection to the control unit for transmitting the position data or the force data to the control unit, and a different sensor channel pair has a signal connection to the additional control unit for transmitting the position data or the force data to the additional control unit' should be understood to mean that one sensor channel pair of the position sensor unit can have a signal connection to the control unit for transmitting the position data to the control unit, and a different sensor channel pair of the position sensor unit can have a signal connection to the additional control unit for transmitting the position data to the additional control unit, and that one sensor channel pair of the force sensor unit can have a signal connection to the control unit for transmitting the force data to the control unit, and a different sensor channel pair of the force sensor unit can have a signal connection to the additional control unit for transmitting the force data to the additional control unit.

The sensor channel pairs of the position sensor unit and/or of the force sensor unit in a braking system according to the invention can each be integrated on a common printed circuit board. As a result, the braking system can be provided especially simply and compactly.

According to an alternative design variant of the present invention, it is possible that the sensor channel pairs of the position sensor unit and/or of the force sensor unit are each integrated on different printed circuit boards that are spaced apart from one another. As a result, the fault tolerance can be increased with regard to an inadvertent or false braking request of the braking system.

It is furthermore possible in a braking system according to the invention that the control unit has a preprocessor for receiving and preprocessing the position data and the force data and a main controller having a signal connection to the preprocessor for further processing of the preprocessed position data and the preprocessed force data, and the additional control unit has an additional preprocessor for receiving and preprocessing the position data and the force data and an additional main controller having a signal connection to the additional preprocessor for further processing of the preprocessed position data and the preprocessed force data. With such an embodiment, long and/or duplicate connection lines between the preprocessor and the main processor are dispensed with. Moreover, digital protocols such as PSI5—which cannot be employed with relatively long transmission paths—can be used between the sensor units and the preprocessor on account of a short signal transmission distance that is possible. In addition, material costs can be saved. Due to the use of the preprocessor, only consolidated position data and/or force data need be sent to the associated and/or higher-level control unit.

In another embodiment of a braking system according to the invention, it is possible that the preprocessor and/or the additional preprocessor are each configured to perform at least one of the following processes: reading in the force data and/or position data; correcting the force data and/or position data that have been read in; applying different force data and/or different position data against each other; and/or comparing different force data and/or different position data with one another.

As a result, the essential data processing processes can be performed in the preprocessor. After that, only a simple signal transmission, which can even be implemented over relatively long signal lines without any difficulty, takes place between the preprocessor and the main controller. In addition to the aforementioned process steps, the following processes can also be performed in the preprocessor or in the preprocessor and the additional preprocessor: filtering of force data and/or position data, subtraction of offsets or deviation values, applying individual signal data items against one another, for example for an averaging of multiple signal data items, which is to say, in particular, of multiple values for force data and/or position data, comparing the different force data and/or the different position data with one another for a monitoring of synchronism, evaluating diagnostic data from individual items of signal data, in particular force data and/or position data, and/or calculating a forwarding signal and/or forwarding data for forwarding to the main controller or the additional main controller or a corresponding higher-level control device, in particular in the form of an ECU.

In another design variant of the present invention, it is possible that the preprocessor and the additional preprocessor are integrated in the brake pedal, and the main controller and the additional main controller are installed outside of the brake pedal. As a result, the braking system can be provided in an especially space-saving manner. Only two simple signal lines for transmitting the signals and/or the data from the preprocessor installed in the brake pedal to the main controller installed outside of the brake pedal, which preferably are designed in the form of suitable ECUs, must be routed out of the brake pedal. Alternatively, wireless or cordless signal or data transmission from the preprocessor to the main controller, by means of a transmission unit for wireless data and/or information transmission of the brake system, is of course also possible.

In addition, it is possible in a braking system according to the invention that the position sensor unit has at least one sensor that measures inductively and the force sensor unit has at least one sensor that measures non-inductively. Increased fault tolerance of the braking system can be achieved with this type of dissimilarity. The at least one sensor that measures non-inductively can have a magnetic sensor, for example a Hall sensor, a TMR sensor, an AMR sensor, or a GMR sensor, or a capacitive sensor. When sensors that measure inductively are used, these sensors preferably share an inductive excitation at a voltage source. Nevertheless, multiple sensor channels can have a common power supply.

It can additionally be advantageous in a braking system according to the present invention when the control unit and each sensor channel having a signal connection to the control unit are connected to a voltage source, and the additional control unit and each sensor channel having a signal connection to the additional control unit are connected to an additional voltage source. The fault tolerance can be improved by this means, as well. According to the invention the control unit, at least one sensor channel of the force sensor unit having a signal connection to the control unit, as well as at least one sensor channel of the position sensor unit having a signal connection to the control unit can be connected to the voltage source for a supply of power to the respective unit. Accordingly, the additional control unit, at least one sensor channel of the force sensor unit having a signal connection to the additional control unit, as well as at least one sensor channel of the position sensor unit having a signal connection to the additional control unit can be connected to the additional voltage source for a supply of power to the respective unit. The voltage source and the additional voltage source preferably are designed to be separate and/or spatially remote from one another.

According to another aspect of the present invention, a vehicle having a braking system as described above is provided. As a result, the vehicle according to the invention offers the same advantages as have been described in detail in relation to the braking system according to the invention. The vehicle is preferably provided in the form of a motor vehicle, in particular a road vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
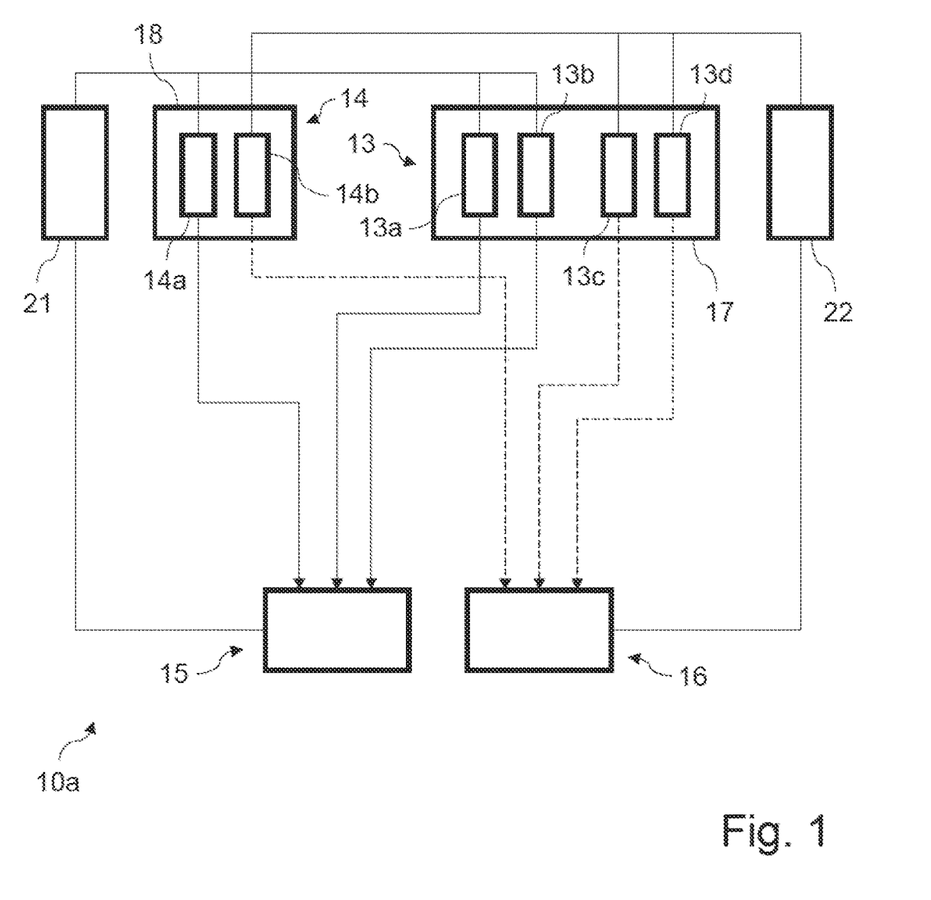
FIG. 1 is a block diagram for describing a braking system according to a first embodiment of the present invention.

FIG. 1 shows a block diagram for explaining a braking system 10a for a vehicle 11 according to a first embodiment of the present invention. The braking system 10a represented in FIG. 1 has a brake pedal 12 shown in FIG. 3 and FIG. 4, a position sensor unit 13 for determining position data regarding an actuation distance and/or a pivot angle of the brake pedal 12 of the vehicle 11, a force sensor unit 14 for determining force data regarding an operating force with which the brake pedal 12 is operated, a control unit 15, and an additional control unit 16. The position sensor unit 13 has a signal connection to the control unit 15 and to the additional control unit 16 for transmitting the position data to the control unit 15 as well as to the additional control unit 16. Furthermore, the force sensor unit 14 has a signal connection to the control unit 15 and to the additional control unit 16 for transmitting the force data to the control unit 15 as well as to the additional control unit 16. In each case, the signal connection is wired through respective signal lines between the sensor units 13, 14 and the control units 15, 16.

As shown in FIG. 1, the control unit 15 and the additional control unit 16 are arranged spaced apart from one another. Furthermore, the control unit 15 and the additional control unit 16 are designed to be dissimilar from one another. More precisely, the position sensor unit 13 has sensors that measure inductively and the force sensor unit 14 has sensors that measure non-inductively. The control unit 15 and the sensor channels 14a, 13a, 13b having a signal connection to the control unit 15 are connected to a voltage source 21. The additional control unit 16 and the sensor channels 14b, 13c, 13d having a signal connection to the additional control unit 16 are connected to an additional voltage source 22.

Figure 2:
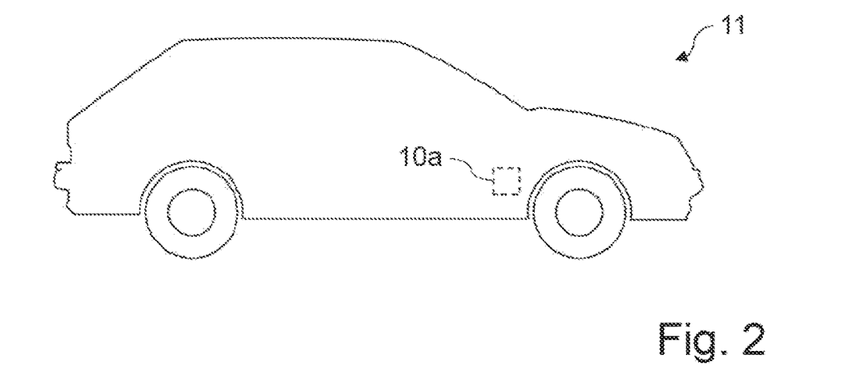
FIG. 2 is a vehicle with a braking system according to the first embodiment shown in FIG. 1.

According to the exemplary embodiment shown in FIG. 1, the position sensor unit 13 has two sensor channel pairs 13a, 13b, 13c, 13d that are arranged separately from one another. In this case, one sensor channel pair 13a, 13b has a signal connection to the control unit 15 for transmitting the position data to the control unit 15, and a different sensor channel pair 13c, 13d has a signal connection to the additional control unit 16 for transmitting the position data to the additional control unit 16. The sensor channel pairs 13a, 13b, 13c, 13d of the position sensor unit 13 are each designed to be galvanically isolated from one another. Furthermore, the sensor channel pairs 13a, 13b, 13c, 13d shown in FIG. 1 of the position sensor unit 13 are integrated on a common printed circuit board 17. The two sensor channels 14a, 14b of the force sensor unit 14 are likewise integrated on a common printed circuit board 18. FIG. 2 shows a vehicle 1 in the form of a passenger car with a braking system 10a described according to FIG. 1.

Figure 3:
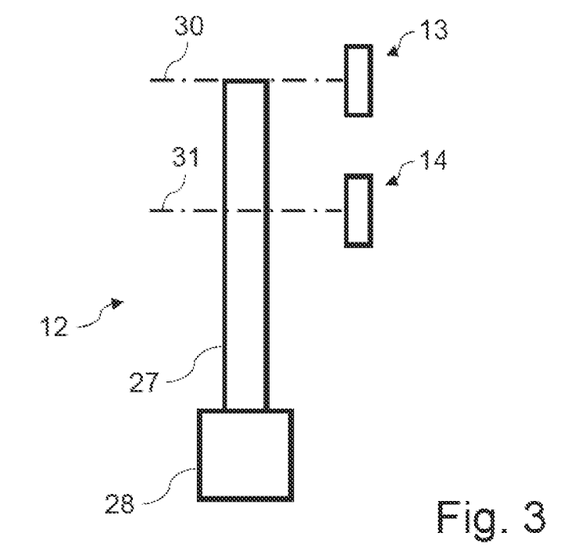
FIG. 3 is a brake pedal in a front view for explaining the first embodiment of the present invention.
Figure 4:
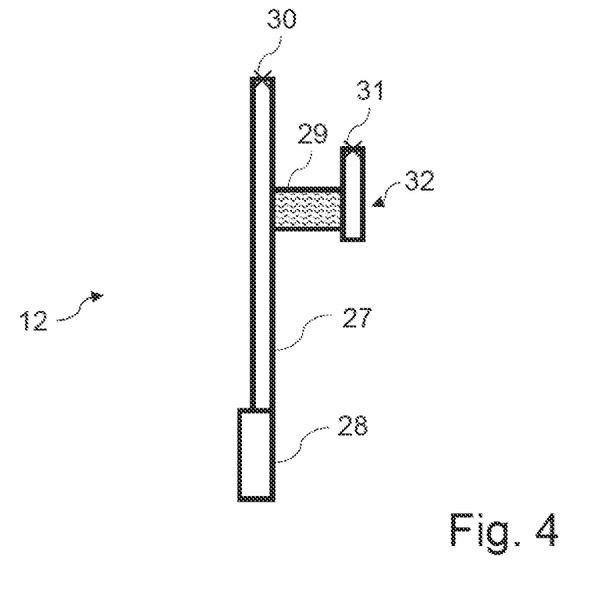
FIG. 4 is a brake pedal in a side view for explaining the first embodiment of the present invention.

A brake pedal 12 is depicted in different views in FIG. 3 and FIG. 4. The brake pedal 12 shown has a pedal arm 27 and a pedal plate 28. The pedal arm 27 is arranged such that it can pivot about a first axis of rotation 30 and a second axis of rotation 31. The position sensor unit 13 is configured and arranged for determining a torsion or a torsion value of the pedal arm 27 about the first axis of rotation 30. The force sensor unit 14 is configured and arranged for determining the force data when there is a torsion of the pedal arm 27 and/or when there is a displacement of a mechanism 32 (not shown in detail) about a second axis of rotation 31. Arranged between the pedal arm 27 and the mechanism 32 is an elastic or resilient unit 29. The elastic unit 29 arranged in the force flow delays the rotation about the second axis of rotation 31 relative to the pedal force on the pedal plate 28 with respect to the first axis of rotation 30. The force applied to the pedal plate 28 is determined from the difference of the position of the position sensor unit 13 and of the force sensor unit 14 as well as from the spring constant of the elastic unit 29.

Figures 5, 6:
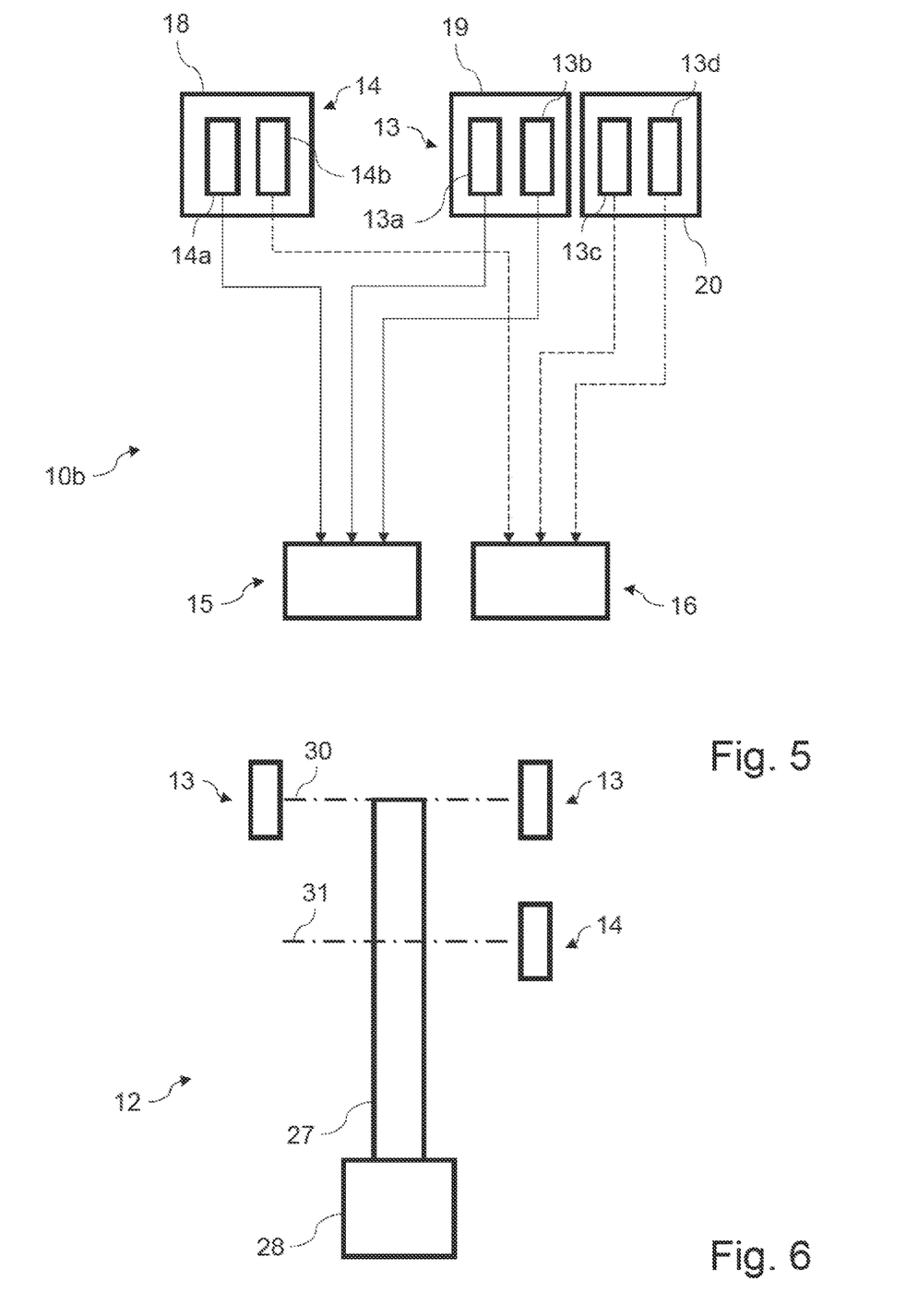
FIG. 5 is a block diagram for describing a braking system according to a second embodiment of the present invention.
FIG. 6 is a brake pedal in a front view for explaining the second embodiment of the present invention.

FIG. 5 shows a block diagram for explaining a braking system 10b according to a second embodiment. In the braking system 10b illustrated in FIG. 5, the sensor channel pairs 13a, 13b, 13c, 13d of the position sensor unit 13 are integrated on different printed circuit boards 19, 20 that are spaced apart from one another. More precisely, one sensor channel pair 13a, 13b is integrated on one printed circuit board 19, and another sensor channel pair 13c, 13d is integrated on another printed circuit board 20. Each sensor channel pair 13a, 13b, 13c, 13d can be understood as one sensor. As shown in FIG. 6, the printed circuit boards 19, 20 with the sensor channel pairs 13a, 13b, 13c, 13d are arranged separately on opposite sides of the pedal arm 27 or the first axis of rotation 30.

Figure 7:
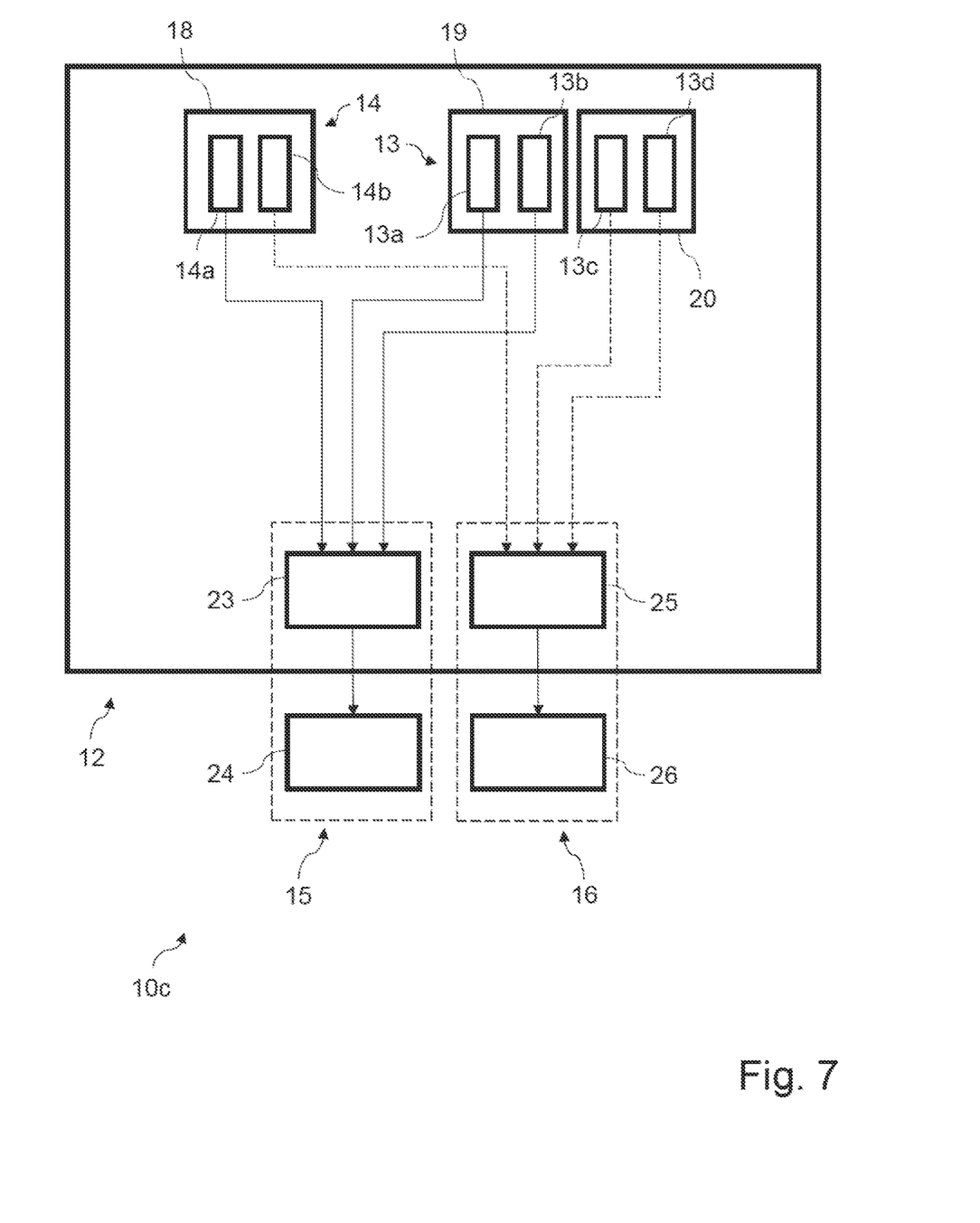
FIG. 7 is a block diagram for describing a braking system according to a third embodiment of the present invention.

FIG. 7 shows a block diagram for explaining a braking system 10c according to a third embodiment. In the embodiment illustrated, the control unit 15 has a preprocessor 23 for receiving and preprocessing the position data and the force data, and a main controller 24 having a signal connection to the preprocessor 23 for further processing of the preprocessed position data and the preprocessed force data. Moreover, the additional control unit 16 has an additional preprocessor 25 for receiving and preprocessing the position data and the force data and an additional main controller 26 having a signal connection to the additional preprocessor 25 for further processing of the preprocessed position data and the preprocessed force data. The preprocessor 23 and the additional preprocessor 24 are each configured to perform the following processes: reading in the force data and position data, correcting the force data and position data that have been read in, applying different force data and different position data against each other, and comparing different force data and different position data with one another.

Furthermore, the preprocessor 23 and the additional preprocessor 25 are integrated in the brake pedal 12, and the main controller 24 and the additional main controller 26 are installed outside of the brake pedal 12.

For the purpose of detecting electrical and mechanical faults in the braking system, both the pedal force and the pedal travel can be determined. The information about the pedal travel can be determined directly from the sensor channels 14a, 14b of the force sensor unit 14. In order to determine the pedal force or the operating force for operating the brake pedal 12, in contrast, first the sensor channels 14a, 14b of the force sensor unit 14 must be applied with a transfer function, which is determined based on the mechanism 32 (not specified in detail), so that the sensor channels 14a, 14b are virtually located at the first axis of rotation 30. After this, the associated signal of the force sensor unit 14 can be subtracted from the signals of the position sensor unit 13 in order to subsequently apply a stiffness of the elastic unit 29 to the result and obtain the pedal force. If a preload is present on the brake pedal 12 or on the elastic unit 29, this must additionally be taken into account. Otherwise, only pedal force changes can be determined, but not the force that is present in absolute terms.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A braking system for a vehicle, the braking system comprising:
   a brake pedal;
   a position sensor to determine position data regarding an actuation distance and/or a pivot angle of the brake pedal of the vehicle;
   a force sensor to determine force data regarding an operating force with which the brake pedal is operated;
   a controller; and an additional controller,
wherein the position sensor has a signal connection to the controller and to the additional controller to transmit the position data to the controller as well as to the additional controller,
wherein the force sensor has a signal connection to the controller and to the additional controller to transmit the force data to the controller as well as to the additional controller,
wherein the force sensor has a sensor channel pair and the position sensor has at least two sensor channel pairs that are arranged separately from one another,
wherein a first sensor channel pair of the at least two sensor channel pairs of the position sensor has a signal connection to the controller for transmitting the position data to the controller, and a second sensor channel pair of the at least two sensor channel pairs of the position sensor has a signal connection to the additional controller for transmitting the position data to the additional controller, and
wherein a first sensor channel of the sensor channel pair of the force sensor has a signal connection to the controller for transmitting the force data to the controller and a second sensor channel of the sensor channel pair of the force sensor has a signal connection to the additional controller for transmitting the force data to the additional controller.

2. The braking system according to claim 1, wherein the controller and the additional controller are arranged spaced apart from one another.

3. The braking system according to claim 1, wherein the controller and the additional controller are designed to be dissimilar from one another.

4. The braking system according to claim 1, wherein the at least two sensor channel pairs of the position sensor are at least partially galvanically isolated from one another and wherein the at least two sensor channel pairs of the position sensor are at least partially galvanically isolated from the sensor channel pair of the force sensor.

5. The braking system according to claim 1, wherein the at least two sensor channel pairs of the position sensor are integrated on a common printed circuit board and the sensor channel pair of the force sensor is integrated on a printed circuit board that is separate from the common printed circuit board.

6. The braking system according to claim 1, wherein the first sensor channel pair of the at least two sensor channel pairs of the position sensor, the second sensor channel pair of the at least two sensor channel pairs of the position sensor and the sensor channel pair of the force sensor are each integrated on different printed circuit boards that are spaced apart from one another.

7. The braking system according to claim 1, wherein the controller has a preprocessor for receiving and preprocessing the position data and the force data and a main controller having a signal connection to the preprocessor for further processing of the preprocessed position data and the preprocessed force data, and the additional controller has an additional preprocessor for receiving and preprocessing the position data and the force data and an additional main controller having a signal connection to the additional preprocessor for further processing of the preprocessed position data and the preprocessed force data.

8. The braking system according to claim 7, wherein the preprocessor and/or the additional preprocessor are each configured to perform at least one of the following processes:

reading in the force data and/or the position data;
correcting the force data and/or the position data that have been read in;
applying different force data and/or different position data against each other; or
comparing different force data and/or different position data with one another.

9. The braking system according to claim 7, wherein the preprocessor and the additional preprocessor are integrated in the brake pedal, and wherein the main controller and the additional main controller are installed outside of the brake pedal.

10. A vehicle comprising a braking system according to claim 1.

11. The braking system according to claim 1, wherein each sensor channel of the first sensor channel pair of the at least two sensor channel pairs of the position sensor has a separate signal connection to the controller and each sensor channel of the second sensor channel pair of the at least two sensor channel pairs of the position sensor has a separate signal connection to the additional controller.

12. A braking system for a vehicle, the braking system comprising:
a brake pedal;
a position sensor to determine position data regarding an actuation distance and/or a pivot angle of the brake pedal of the vehicle;
a force sensor to determine force data regarding an operating force with which the brake pedal is operated;
a controller; and
an additional controller,
wherein the position sensor has a signal connection to the controller and to the additional controller to transmit the position data to the controller as well as to the additional controller,
wherein the force sensor has a signal connection to the controller and to the additional controller to transmit the force data to the controller as well as to the additional controller, and
wherein the position sensor has at least one sensor that measures inductively, and the force sensor has at least one sensor that measures non-inductively.

13. A braking system for a vehicle, the braking system comprising:
a brake pedal;
a position sensor to determine position data regarding an actuation distance and/or a pivot angle of the brake pedal of the vehicle;
a force sensor to determine force data regarding an operating force with which the brake pedal is operated;
a controller; and
an additional controller,
wherein the position sensor has a signal connection to the controller and to the additional controller to transmit the position data to the controller as well as to the additional controller,
wherein the force sensor has a signal connection to the controller and to the additional controller to transmit the force data to the controller as well as to the additional controller, and
wherein the controller and each sensor channel having a signal connection to the controller are connected to a voltage source, and wherein the additional controller and each sensor channel having a signal connection to the additional controller are connected to an additional voltage source.

* * * * *